Figure 1:
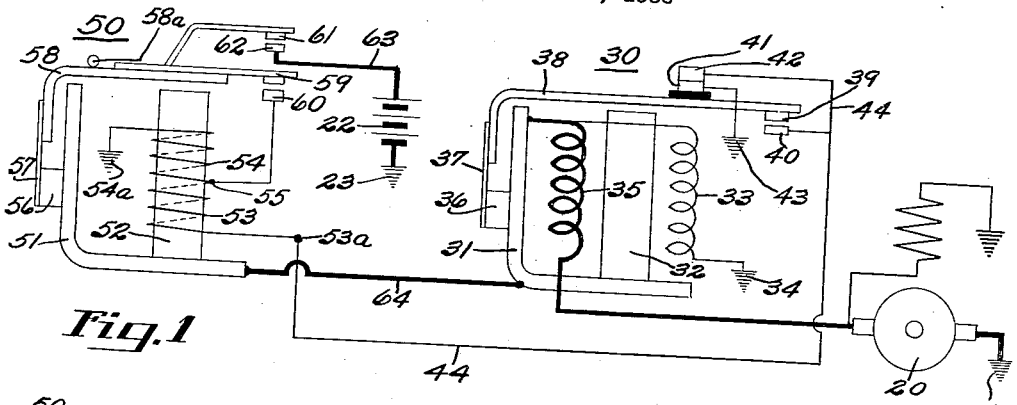
Figure 2:
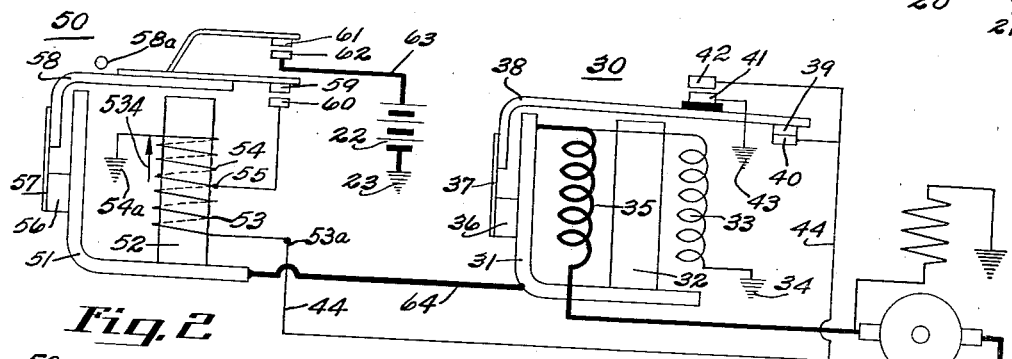

May 28, 1940.

W. J. RADY 2,202,121

BATTERY CHARGING SYSTEM

Filed Feb. 23, 1938

INVENTOR
WILLIAM J. RADY
BY
Spencer Hardman & Fehr
his ATTORNEYS

Patented May 28, 1940

2,202,121

UNITED STATES PATENT OFFICE 2,202,121

BATTERY CHARGING SYSTEM

William J. Rady, Anderson, Ind., assignor to General Motors Corporation, Detroit, Mich., a corporation of Delaware Application February 23, 1938, Serial No. 191,899

4 Claims. (Cl. 171—314)

This invention relates to battery charging systems comprising a storage battery and a generator driven by a variable speed power plant and connected with the battery by automatic circuit controller means which automatically connects the generator with the battery when the generator voltage exceeds the C. E. M. F. of the battery and disconnects the battery when its C. E. M. F. exceeds that of the generator. In the automotive type of battery charging system, it has been customary to use a reverse current or cutout relay comprising an electromagnet having a voltage coil responsive to generator voltage for closing a pair of contacts in the charging circuit. When these contacts close, a series or current coil becomes energized to hold the contacts closed, although the generator voltage may vary within certain limits due to variation in speed. When the generator speed has decreased to a certain low value such that the battery begins to discharge a substantial amount of current into the generator, the series coil will overcome the voltage or shunt coil and the relay contacts will open in order to prevent discharge of the battery.

On an automobile, the generator is directly connected to the engine. Therefore, the generator cannot operate as a motor to build up a C. E. M. F. when the battery is discharging into it. Therefore, the reverse current immediately increases to a value which opens the relay. I have found that the conventional reverse current relay is unsuitable for battery charging systems where the generator, normally driven by a power plant, is capable of being driven as an electric motor in case of reversal of current from the battery to the generator. One of such power plants is a wind wheel or propeller operated by a wind current for driving the generator.

There are certain conditions to be met with in wind driven generator charging systems that are not present in the automotive generating plant. For wind driven generators it is necessary to have a relay which will open the circuit on a very low reverse current, otherwise the reverse current would be sufficient to drive the generator; and, if this condition continued, the battery would become discharged. On an automobile, the generator is direct-connected to the engine, and cannot be driven as a motor. Instead of driving the generator, the reverse current immediately increases to a value which would open the cutout relay. It is also necessary to prevent any vibration of the relay contacts while opening and closing the circuit, since this would make a radio set, operating in the vicinity, very noisy. In an automobile this point of make and break is passed through so rapidly that any vibration would not be noticed, but a wind-driven generator may continue to run at this critical speed for a considerable period of time.

To secure a relay which would open on a very low reverse current, it is necessary that it be very sensitive, and that the spring tension and magnetic pull be very nearly balanced through a movement of the armature necessary to open and close the contacts. This means that the contact pressure with low charging current would be very small, and not sufficient for satisfactory opening and closing of the battery charging circuit. Since a relay of this nature is very sensitive to a small change in voltage, it is very difficult to be sure that the contacts, having once closed, will not vibrate due to changes in the voltage caused by the act of closing, and also due to slot and commutator ripple of the generator.

It is an object of the present invention to overcome these difficulties by providing a circuit controller which will open the circuit on a very low reverse current, which will maintain the charging circuit closed with adequate contact pressure, when once it has been closed in response to attainment of a certain generator voltage, and which will not open the charging circuit again until the generator voltage has dropped to a value such that current begins to discharge in a relatively low amount from the battery to the generator. In order to accomplish this object, I employ a reverse current relay of the conventional type, but add to it a second pair of contacts. Neither of the pairs of contacts of this modified cut-out relay are used to carry the charging current, but the opening or closing thereof is employed to control a second instrument called a circuit breaker relay which provides the contacts for carrying the charging current. The cutout relay operates to close one pair of contacts while separating a pair of initially closed contacts to complete a circuit whereby the circuit breaker relay closes the charging current contacts. Before the charging current contacts will open again, the cutout relay must return to original condition, closing that pair of contacts that were separated, while battery charging was going on. The circuits and instruments are so constructed and arranged that the cut-out relay armature may vibrate between the second circuit closing position and the initial position without causing the circuit breaker relay to open the charging circuit. It is only the return of the cut-out relay to its initial contact making position that causes the circuit breaker relay to open the charging circuit.

Further objects and advantages of the present invention will be apparent from the following description, reference being had to the accompanying drawing wherein a preferred embodiment of the present invention is clearly shown.

In the drawing:

Figs. 1, 2, 3 and 4 are similar wiring diagrams showing circuit controlling means embodying the present invention in four different conditions of operation.

Referring to Fig. 1, 20 designates a generator grounded at 21 and 22 designates a storage battery grounded at 23. The generator 20 is connected with the battery 22 by two instrumentalities namely a cut-out relay 30 and a circuit breaker relay 50.

The cutout relay 30 comprises a magnetizable frame 31 carrying a magnetizable core 32 surrounded by a shunt or voltage coil 33 grounded at 34 and connected with the frame 31 and by a series or current coil 35 connected with frame 31 and with the generator 20. Frame 31 is connected by conducting block 36 with a spring hinge 37 attached to a conducting armature 38 carrying a contact 39 engageable with a contact 40. Armature 38 insulatingly supports a contact 41 initially engageable with a stationary contact 42. The spring hinge 37 biases the armature 38 upwardly so that the contact 41 normally engages the contact 42 and the contact 39 is normally separated from the contact 40. Contact 41 is grounded at 43. Contact 42 is connected by wire 44 with the contact 40 and with a terminal 53a of circuit breaker relay 50.

Circuit breaker relay 50 comprises an L-shaped magnetizable frame 51 carrying a magnetizable core 52 surrounded by windings 53 and 54 which are connected by tap 55 with a contact 60. Winding 54 is grounded at 54a. Frame 51 carries a conducting support 56 which carries a spring hinge 57 which supports a magnetizable armature 58 and urges the same against a stop 58a. Armature 58 carries a resiliently mounted contact 59 engageable with the contact 60 and a resiliently mounted contact 61 which is engageable with a stationary contact 62. Contacts 59 and 61 are electrically connected with the armature 58. Contact 62 is connected by a wire 63 with the battery 22.

Figure 3:
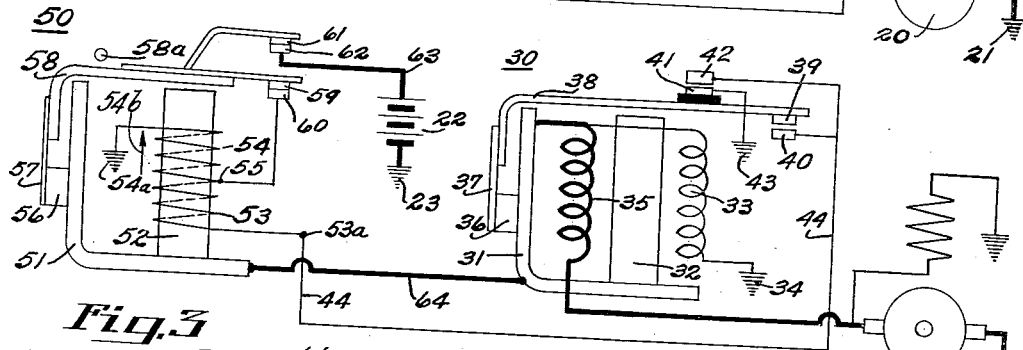

The normal or initial condition of the apparatus is shown in Fig. 1. When the generator has attained such speed that its voltage is such that the shunt or voltage coil 33 of cutout relay 30 is energized sufficiently to overcome the spring 37, the armature 38 will move from the position shown in Fig. 1 to that shown in Fig. 2. Then contact 39 will engage contact 40 and current will flow to the windings 53 and 54 of the circuit breaker relay 50 through the following circuit: generator 20, coil 35, frame 31, hinge 37, armature 38, contact 39, contact 40, wire 44, magnet coils 53 and 54, and ground connections 54a and 21. The magnet coils 53 and 54 act cumulatively as indicated by arrow 53A. The armature 58 of circuit breaker relay 50 will then be actuated from the position shown in Fig. 2 to that shown in Fig. 3, whereupon contact 59 will engage 60 and contact 61 will engage contact 62. Then the following charging circuit will be established as shown in Fig. 3: generator 20, series coil 35, frame 31, wire 64 connecting frame 31 with frame 51 of circuit breaker relay 50, frame 51, armature 58, hinge 57, armature 58, contact 61, contact 62, wire 63, battery 22, ground connections 23 and 21. The engagement of contact 59 with the contact 60 connects the magnet coil 54 with the generator-to-battery-circuit independently of the contacts 39 and 40 of the cutout relay 30. Therefore, although contact 39 may be separated from contact 40, the magnet 54 remains energized as indicated by arrow 54b and holds the armature 58 down. The battery charging circuit will remain closed although the cutout relay armature 38 may vibrate until it moves upwardly to carry contact 41 into engagement with the contact 42. In other words, the opening of the cutout relay contacts 39 and 40 do not effect the opening of circuit breaker relay contacts 61 and 62, unless cutout relay contacts 41 and 42 should be reengaged.

Figure 4:
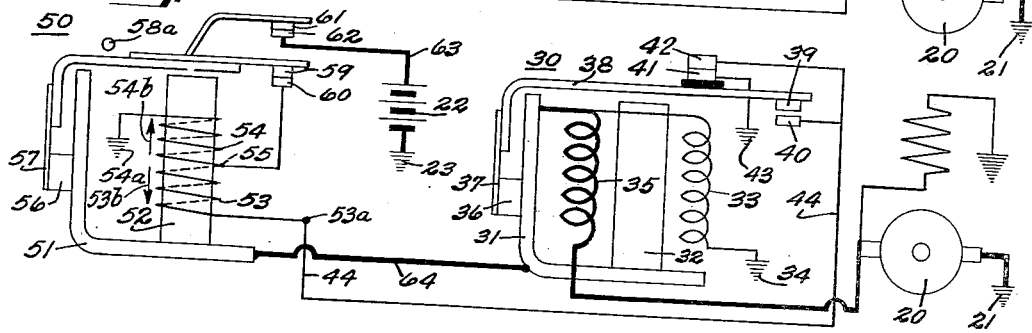

When the generator slows down so that its generated voltage is less than the battery voltage, the current in coil 35 will reverse, thus bucking the current flowing in coil 33. Then contacts 39 and 40 will open and contacts 41 and 42 will close as shown in Fig. 4. Before contacts 59 and 60 open, current will flow into the tap 55 and then divide, part of it going through coil 54 to ground and the remainder going through coil 53, terminal 53a, wire 44, contacts 41 and 42 to ground 43. Therefore, the coils 53 and 54 will be in opposing or bucking relation, as indicated by opposed arrows 53b and 54b in Fig. 4, thereby so weakening the magnetism of the circuit breaker relay 50 that the armature 58 will move upwardly to open the charging circuit at 61 and 62 and open the magnet winding control circuit at 59 and 60. After the contacts 59 and 60 have once opened, the coils 53 and 54, considered as one coil, are grounded at each end so that there cannot possibly be any variation in voltage which would cause the contacts to vibrate.

From the foregoing description of the construction and mode of operation of the automatic circuit controller, it will be seen that the controller consists of a conventional cutout relay which has been modified by the addition of contacts 41 and 42 to provide the cutout relay 30. This cutout relay 30 does not function in the usual manner of a conventional cutout relay, since it does not of itself complete the battery charging circuit. It merely completes a control circuit for the circuit breaker relay 50. By embodying a reverse current relay 30 which is separate from relay circuit breaker 50 which actually carries the battery charging current, I am able to obtain all the advantages of sensitivity with none of its disadvantages. The relay 30 can be adjusted to open on very low reverse current, thus making it a sensitive relay and one in which the spring tension and the magnetic pull are very nearly balanced through a movement of the armature necessary to open and close the contacts. Such an adjustment means that the contact pressure of the contacts of the cutout relay 30 is very small and would be unsatisfactory for the battery charging circuit. However, that is not a difficulty, since the contacts of relay 30 do not carry the battery charging circuit. Battery charging current is carried by the relay 50 which can be adjusted to give the desired contact pressure independent of any adjustment of relay 30. Since the relay 30 is relatively sensitive to small changes in voltage, it follows that the armature 38 is subject to vibration, because it is difficult to be sure that the relay contacts 39 and 40, having once closed will not vibrate due to changes in the voltage caused by the act of closing these contacts and also due to slot and commutator ripple of the generator. The armature 38 will vibrate more or less, but this does not influence the circuit breaker relay 50. When once the relay 50 has been closed by the engagement of contacts 39 and 40 of the relay 30, the armature 38 of relay 30 may vibrate at will between its two contact making positions, since it is not until contacts 41 and 42 are reengaged that the contacts of relay 50 will open again. If relay 30 were carrying the battery charging current, considerable sparking would result and this would be objectionable especially where a radio is in the vicinity, as would often be the case in connection with a wind wheel generator plant, where it is used to supply radio current for a home.

In the conventional automobile charging system using the conventional cutout relay to carry the battery charging current, the point of make and break of the cutout relay is passed through so rapidly that the amount of vibration is imperceptible and has no noticeable effect on the automobile radio; but, in the case of a wind driven generator, it may continue to run at a critical speed for a considerable period of time during which vibration of the relay would continue. The vibration of armature 38 of relay 30 has no perceptible effect on the radio set.

The figures of the drawing show a leaf spring hinge 57 which biases the armature 52 toward contact open position. It will be understood, however, that this showing is only diagrammatic and that, if preferred, one may use an armature hinged on a pivot and biased by a separate coil spring. It is advisable that coil 53 of the circuit breaker unit have more ampere turns than coil 54, so that it will neutralize both coil 54 and the residual magnetism in the iron circuit of the relay. The number of turns in coil 53 relative to coil 54 is immaterial, but if coil 53 is wound next to the core and coil 54 wound over it, coil 53 will, therefore, have less resistance per turn, and therefore, slightly more ampere turns than coil 54. Coil 53 could also be wound with a very slightly larger wire than coil 54. If coil 53 is wound over 54, and with the same size wire, the relay will not operate properly since, in this instance, coil 53 will not completely neutralize coil 54 plus the residual magnetism of the relay. Of course, an increased air gap between the armature and core would still allow the unit to perform, but would require much larger coils to obtain the same pressure on the contacts.

The present invention may be used advantageously in connection with a larger sized automotive generating plant such as used on passenger buses, since it is not feasible to use a sufficient number of series turns on the cutout relay to insure a low breaking current due to the large size wire required to take care of the output required in passenger bus service. Contacts used on relays of this character are necessarily large and are usually arranged in multiple so that a strong closing coil (responsive to generator voltage) is necessary; and this, in turn, would require a still larger series coil to keep the reverse current at low value. From a standpoint of cost and size, it is not commercially practicable to construct a single relay which would handle such service. The combined reverse current relay and circuit breaker relay of the present invention could therefore be used advantageously.

While the embodiment of the present invention as herein disclosed, constitutes a preferred form, it is to be understood that other forms might be adopted, all coming within the scope of the claims which follow.

What is claimed is as follows:

1. A battery charging system comprising a prime mover, a generator driven thereby, a battery charged by the generator, a battery charging circuit, a reverse current relay having an electromagnet energized by a shunt coil responsive to generator voltage and by a series coil in the battery charging circuit and having a pair of normally open contacts and an armature for actuating said contacts; a pair of normally closed contacts opened by the armature when closing the relay contacts; a circuit breaker relay comprising an electromagnet and an armature; a circuit, established by the movement of attraction of the reverse current relay to close the normally open contacts and to open the normally closed contacts, for causing the battery to be connected with the electromagnet of the circuit breaker relay; a circuit, established by the movement of attraction of the circuit breaker relay armature to complete the battery charging circuit and for making connection between the battery and electromagnet of the circuit breaker relay independently of the connection made by reverse current relay; and a circuit, established by a return of the reverse current relay armature to normal position and engagement of the normally closed contacts for causing the electromagnet of the circuit breaker relay to be rendered inoperative, whereupon the battery charging circuit is interrupted.

2. A battery charging system according to claim 1 further characterized by the fact that the magnet coil of the circuit breaker relay has two winding sections and that the establishment of the circuit by the reclosing of the normally closed contacts of the reverse current relay, causes sections of the electromagnet coil of the circuit breaker relay to be electrically connected in differential relation.

3. A battery charging system according to claim 1 further characterized by the fact that the magnet coil of the circuit breaker relay has two winding sections and that the establishment of the circuit by the movement of the attraction of the reverse current relay armature, electrically connects sections of the electromagnet coil of the circuit breaker relay in cumulative relation when the generator voltage exceeds battery voltage to effect the attraction of the armature of the circuit breaker relay, and characterized by the fact that the establishment of the circuit by the reclosing of the normally closed contacts actuated by the reverse current relay, causes said sections of the electromagnet of the circuit breaker relay to be electrically connected in differential relation to permit the release of the circuit breaker relay armature.

4. A battery charging system according to claim 1 further characterized by the fact that the armature of the reverse current relay carries the movable contacts of the two pairs of contacts actuated by said armature, and that the circuit breaker relay has two pairs of normally open contacts caused to be closed by the movement of attraction of the circuit breaker relay armature which carries the movable contact of each of the pairs of circuit breaker relay contacts, one of said pairs of circuit breaker relay contacts closing to complete the battery charging circuit and the other of said pairs of contacts closing to complete, independently of the reverse current relay, the circuit for connecting the battery with the electromagnet of the circuit breaker relay.

WILLIAM J. RADY.